(12) United States Patent
Yadav et al.

(10) Patent No.: US 8,200,798 B2
(45) Date of Patent: Jun. 12, 2012

(54) ADDRESS SECURITY IN A ROUTED ACCESS NETWORK

(75) Inventors: Navindra Yadav, San Jose, CA (US);
Suresh Katukam, San Jose, CA (US);
Abhay Roy, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 324 days.

(21) Appl. No.: 12/027,976

(22) Filed: Feb. 7, 2008

(65) Prior Publication Data
US 2009/0172156 A1 Jul. 2, 2009

Related U.S. Application Data

(60) Provisional application No. 61/017,625, filed on Dec. 29, 2007.

(51) Int. Cl.
*G06F 15/173* (2006.01)
(52) U.S. Cl. ........ 709/223; 709/221; 709/241; 370/401; 370/392

(58) Field of Classification Search ........... 709/223–224
See application file for complete search history.

(56) References Cited

U.S. PATENT DOCUMENTS

| | | | | |
|---|---|---|---|---|
| 6,085,238 A | * | 7/2000 | Yuasa et al. | 709/223 |
| 6,973,057 B1 | * | 12/2005 | Forslow | 370/328 |
| 7,516,487 B1 | * | 4/2009 | Szeto et al. | 726/22 |
| 7,895,360 B2 | * | 2/2011 | Lockridge et al. | 709/242 |
| 2005/0259654 A1 | * | 11/2005 | Faulk, Jr. | 370/392 |

OTHER PUBLICATIONS

"Service Advertisement Framework Configuration Guide, Cisco IOS Release 12.2SX," Cisco Systems, Inc., Apr. 2005, pp. i-58.

* cited by examiner

*Primary Examiner* — Hua Fan
(74) *Attorney, Agent, or Firm* — Cesari and McKenna, LLP; Michael R. Reinemann

(57) ABSTRACT

In one embodiment, providing multi-layer address security incorporating Layer 2 Media Access Control (MAC) addresses and corresponding Layer 3 Internet Protocol (IP) addresses for host machines on a routed access network is provided.

15 Claims, 6 Drawing Sheets

| MAC Address | IP Address | Address Type (IPv4 / IPv6) | Vlan ID | Forwarder | Switch Port | Logged in User Role | Group | Device Type |
|---|---|---|---|---|---|---|---|---|
| 0011.92d5.5d90 (Host A) | 172.20.143.5 | IPv4 | 5 | 171.2.2.1 (F1) | Fast Ethernet 1/0/1 | Nurse | Healthy | Blood Pressure |
| 0011.92d5.5ef1 (Host B) | 172.20.145.2 | IPv4 | 11 | 171.2.3.5 (F2) | Gigabit Ethernet 1/0/2 | Doctor | Infected | Ultra Sound |
| 0011.92d5.2645 (Host C) | 172.20.145.100 | IPv4 | 10 | 171.2.3.6 (F3) | Gigabit Ethernet 1/0/1 | Doctor | Quarantined | Ultra Sound |
| 0011.9223.5730 (Host D) | 172.20.143.8 | IPv4 | 5 | 171.2.3.6 (F4) | Gigabit Ethernet 1/0/2 | Nurse | Healthy | Blood Pressure |
| 0011.92d6.5677 (Host E) | 172.20.145.6 | IPv4 | 4 | 171.2.2.1 (F5) | Fast Ethernet 1/0/2 | Technician | Healthy | Ultra Sound |

ADDRESS SECURITY IN A ROUTED ACCESS NETWORK

RELATED APPLICATIONS

The present application claims priority under §35 U.S.C. 119(e) to U.S. provisional patent application No. 61/017,625 filed Dec. 29, 2007 entitled "Address Security In A Routed Access Network" assigned to the Assignee of the present application, Cisco Technology, Inc. of San Jose, Calif., the disclosure of which is incorporated herein by reference for all purposes.

TECHNICAL FIELD

The present disclosure relates to address security in routed access networks. More specifically, the present disclosure relates to methods and systems for providing multi-layer address security incorporating Layer 2 Media Access Control (MAC) addresses and corresponding Layer 3 Internet Protocol (IP) addresses for host machines on a routed access network.

BACKGROUND

In today's network security technology, there are two main types of protection; layer 2, or Media Access Control (MAC), protection, or layer 3, or Internet Protocol (IP) protection.

Layer 2 protection incorporates feature where when the maximum number of secure MAC addresses is reached on a secure port and the source MAC address of the ingress traffic is different from any of the identified secure MAC addresses, or if the traffic with a secure MAC address as its source that is already configured or learned on another secure port attempts to ingress through a different secure port, a security violation is generated. This practice is known as port security and is a layer 2 recommended best practice for security.

When Layer 3 routing is pushed to the access layer, the access switches not directly connected to the end device, get to see the IP addresses and not the MAC addresses of connected devices, as the routing protocols only distribute the IP addresses. While this allows for layer 3 IP protection protocols to be in effect, it breaks the layer 2 protection security protocols. Pushing routing to the access layer, has another undesired side effect, in that it eliminates the possibility of the network infrastructure devices (like switches) present in the earlier (before pushing routing to the access layer) layer 2 network from validating the binding of the source MAC address and source IP address for the data traffic, and identifying conditions when an IP address is, for example, being spoofed.

OVERVIEW

In one embodiment of the present disclosure providing one or more switches in the network, providing one or more host devices for accessing the network, providing a database of host information, accessible by at least one of the one or more switches in the network, storing the database of host information in each switch in the network, and synchronously updating the database of host information accessible by at least one of the one or more switches in the network and the database of host information stored in each switch in the network when a change in the topology of the network is detected based at least in part on one or more of an end host or end device connectivity change detection in the network, is provided.

BRIEF DESCRIPTION OF THE DRAWINGS

FIG. 3 is a sample data table of host information, for practicing one or more embodiments of the present disclosure;

DESCRIPTION OF EXAMPLE EMBODIMENTS

Figure 1:
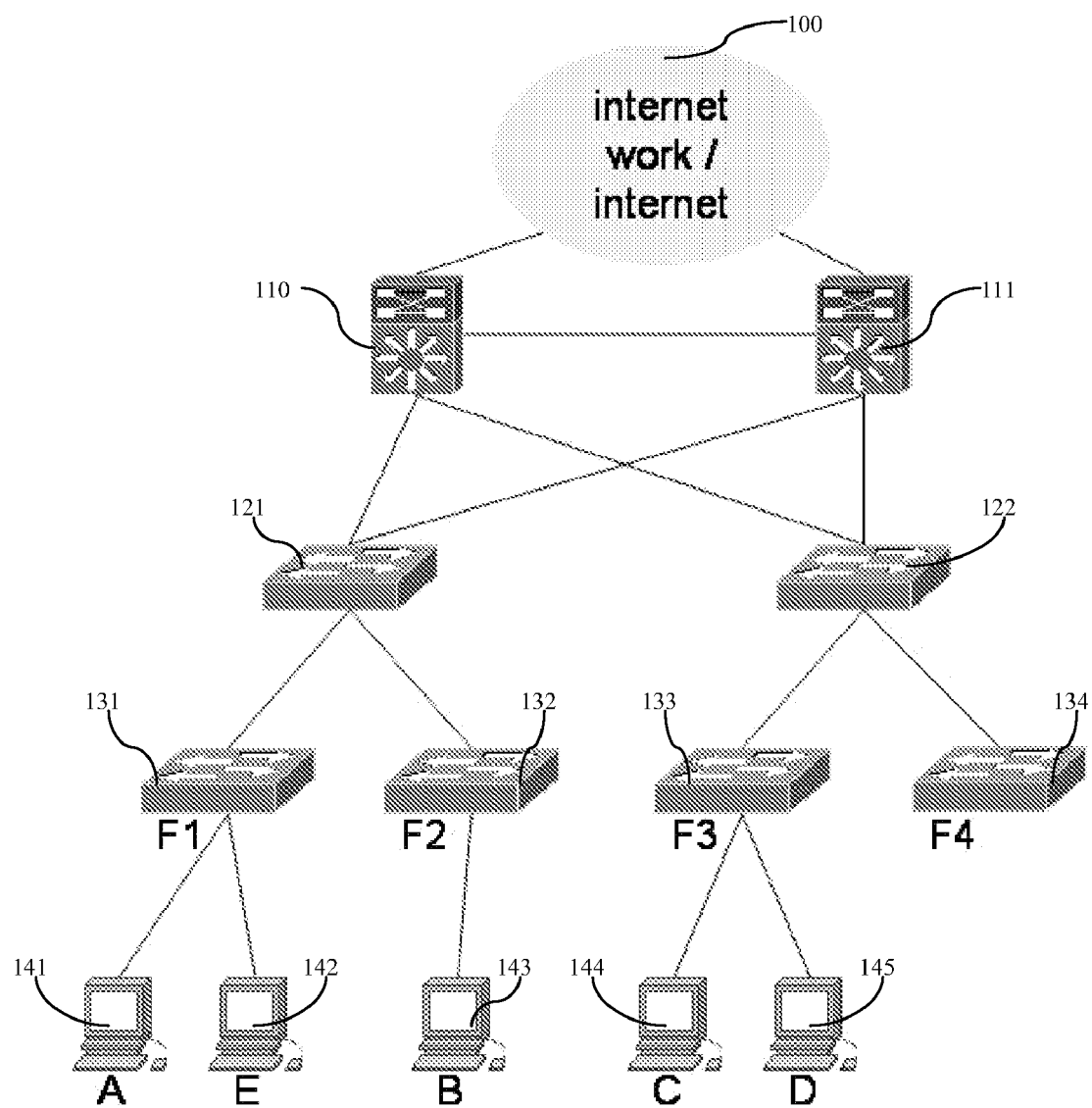
FIG. 1 is a block diagram of a routed access network, including core switches, distribution or intermediary switches, access switches, and host or end point machines or devices, for practicing one or more embodiments of the present disclosure.

FIG. 1 is a block diagram of a routed access network, including core switches, distribution or intermediary switches, access switches, and host or end point machines or devices, for practicing one or more embodiments of the present disclosure. Referring to FIG. 1, a basic routed access network includes core switches 110, 111, distribution or intermediary switches 121, 122, access switches 131-134, and host devices 141-145, linked together over a wired or wireless network, and generally connected to the internet 100. The number of switches and maximum host devices is variable depending upon the size of the network, and for small networks, the distribution or intermediary switches are not necessary.

Referring still to FIG. 1, data from the host devices 141-145 is generally routed through the access switches 131-134, also referred to as forwarders, then through the distribution or intermediary switches 121, 122, and to the core switches 110, 111, which may be connected directly to the internet or to the data center switches. Each host device 141-145 has a unique and distinctive host address associated with it. This address is made of two main layers of information; the layer 2 media access control (MAC) address and the layer 3 internet protocol (IP) address. The MAC address, also know as the Ethernet hardware address (EHA), is generally a globally unique identifier attached to most network adapters, and acts as a name for the particular network adapter. Most MAC addresses use one of the IEEE standardized protocols; MAC-48, EUI-48®, and EUI-64®. The IP address is generally a location address in a network. There are currently two main versions of IP and their associated IP address families; IPv4 and IPv6. IP addresses can be either static or dynamic, and are generally unique within a network, however, unlike MAC addresses, are usually not globally unique.

FIG. 3 is a sample data table of host information, for practicing one or more embodiments of the present disclosure. Referring to FIGS. 1 and 3, in one embodiment of the present disclosure, when an access switch 131-134 detects the connection of a new host device 141-145 to the network, the host information data of the host device 141-145 is received by the access switch 121-124 and is forwarded to the core switches 110, 111. The host information provided by the host device 141-145 includes both the MAC address and the IP address of the device, which is forwarded along with port and forwarder information determined by the access switch 131-134 to the core switches 110, 111. The host information is compared to a data table of host information 300, and it is determined if the host device 141-145 is authorized to access the network. Including both the MAC address 301 and IP address 302 of the host device helps eliminate the practice of spoofing, which is when an unauthorized host device transmits an IP address 302 corresponding to a different host device, in order to gain access to the network. It is much more difficult to counterfeit both a MAC address 301 and an IP address 302 of a host device in order to gain unauthorized access to the network, and additionally, with the incorporation of the data table of host information 300, the network can determine if the host device corresponding to the MAC address 301 and IP address 302 forwarded is already connected to the network from a different location based on the port and forwarder information provided by the access switch 121-124. The overall result is a multi-layered security measure to protect the network from access by unauthorized host devices.

Referring to FIG. 3, the host information data table 300 can include many different categories of information for host devices 141-145. In addition to the MAC address 301 and the IP address 302, the data table 300 may include information such as the IP address type 303, virtual local area network (VLAN) identification 304, the address of the forwarder 305 the host device is currently connected to, or the specific port 306 the host device is currently connected to. Furthermore, the host information data table 300 may include identification tags for easier grouping of users and locations. For example, there may be tags for, but not limited to, the meta role of the specific user 307 logged in to the network device, a device security posture status defining group 308, and a specific device type 309. The data included in the data table in FIG. 3, is an example of a host information data table 300 for a routed access network for a location such as a hospital.

Figure 2:
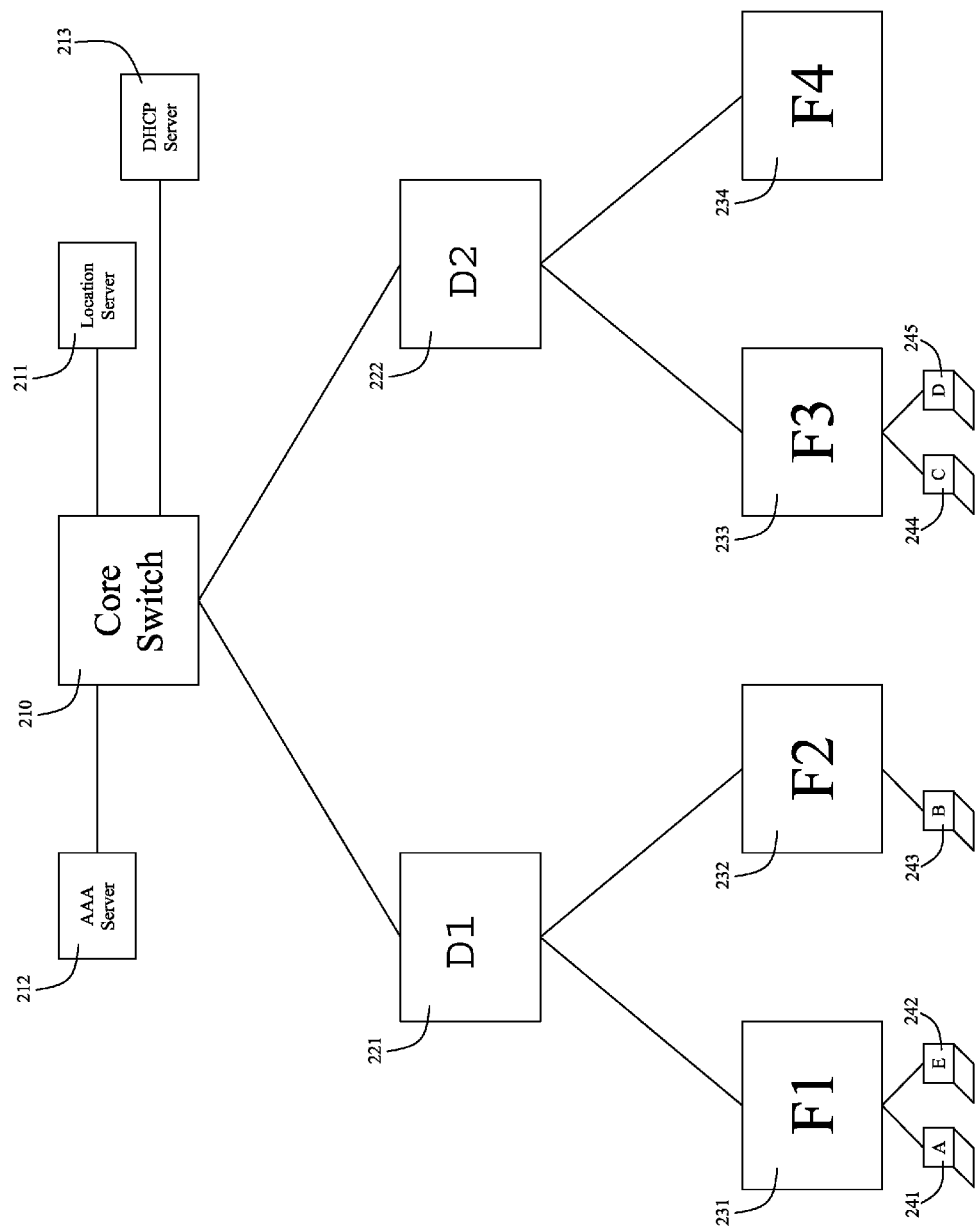
FIG. 2 is a block diagram of a routed access network, including core switches, distribution or intermediary switches, access switches, host or end point machines or devices, and additionally containing a location server, authentication authorization accounting (AAA) server, and dynamic host configuration protocol (DHCP) server, for practicing one or more embodiments of the present disclosure.

FIG. 2 is a block diagram of a routed access network, including core switches, distribution or intermediary switches, access switches, host or end point machines or devices, and additionally containing a location server, authentication authorization accounting (AAA) server, and dynamic host configuration protocol (DHCP) server, for practicing one or more embodiments of the present disclosure. Referring to FIG. 2, FIG. 2 is another possible arrangement for a routed access network including a core switch 210, distribution switches 221-222, access switches 231-234, host devices 241-245, a location server 211, an AAA server 212, and a DHCP server 213.

Referring to FIGS. 1, 2 and 3, in one embodiment of the present disclosure, the data table of host information 300 is stored in the core switches 110, 111. The data table 300 is updated whenever a topology change in the network occurs, such as a connection or disconnection of a host device. In a different network arrangement, the data table of host information 300 may be stored on a separate location server 211, coupled to the core switch 210, freeing memory space in the core switch 210. The AAA server 212 may be included in the network arrangement for the purposes of authenticating host devices 241-245 that do not have the capability of transmitting their own authentication data. The DHCP server 213 may be included for the network to have the added ability of using dynamic IP addresses for host devices 241-245 connected to the network.

Referring back to FIG. 1, in one embodiment of the present disclosure, a copy of the host information data table 300 is stored in every switch in the network. In this case, when a topology change, such as a connection or disconnection of a host device 141-145, occurs in the network, a synchronous update of the host information data table 300 is distributed throughout the network. Two possible distribution protocols are Service Advertisement Framework protocols and Open Shortest Path First protocols. It is understood and incorporated herein that other possible protocols may be used to distribute the updated host information data table throughout the network.

Referring back to FIG. 2, in another embodiment of the present disclosure, the data table of host information 300 is stored on a location server 211. The core switch 210 and the access switches 231-234 are all linked to the database of host information 300 stored on the location server, however, as it is not necessary for the distribution or intermediary switches 221, 222 to access the host information data table 300, these switches are not linked to the location server. This method serves to save memory in each of the switches as it does not require memory to be used to store the data table of host information 300 in each individual switch.

Referring to FIGS. 1, 2, and 3, in yet another embodiment of the present disclosure, the host information data table 300 is also useful for the operation of troubleshooting the network. Since the location and host information for every host device 141-145, 241-245 and every switch is located in the host information data table 300, it is much simpler to find where any possible problems are occurring and allow for quicker troubleshooting. Previously, troubleshooting had to be done in a sequential manner, moving through each switch until the desired host was reached. With the incorporation of the host information data table 300, network administrators can tell specifically where the troubled device is located, both in a network setting and physically by the switch and port location and subsequent device tags.

Figure 4:
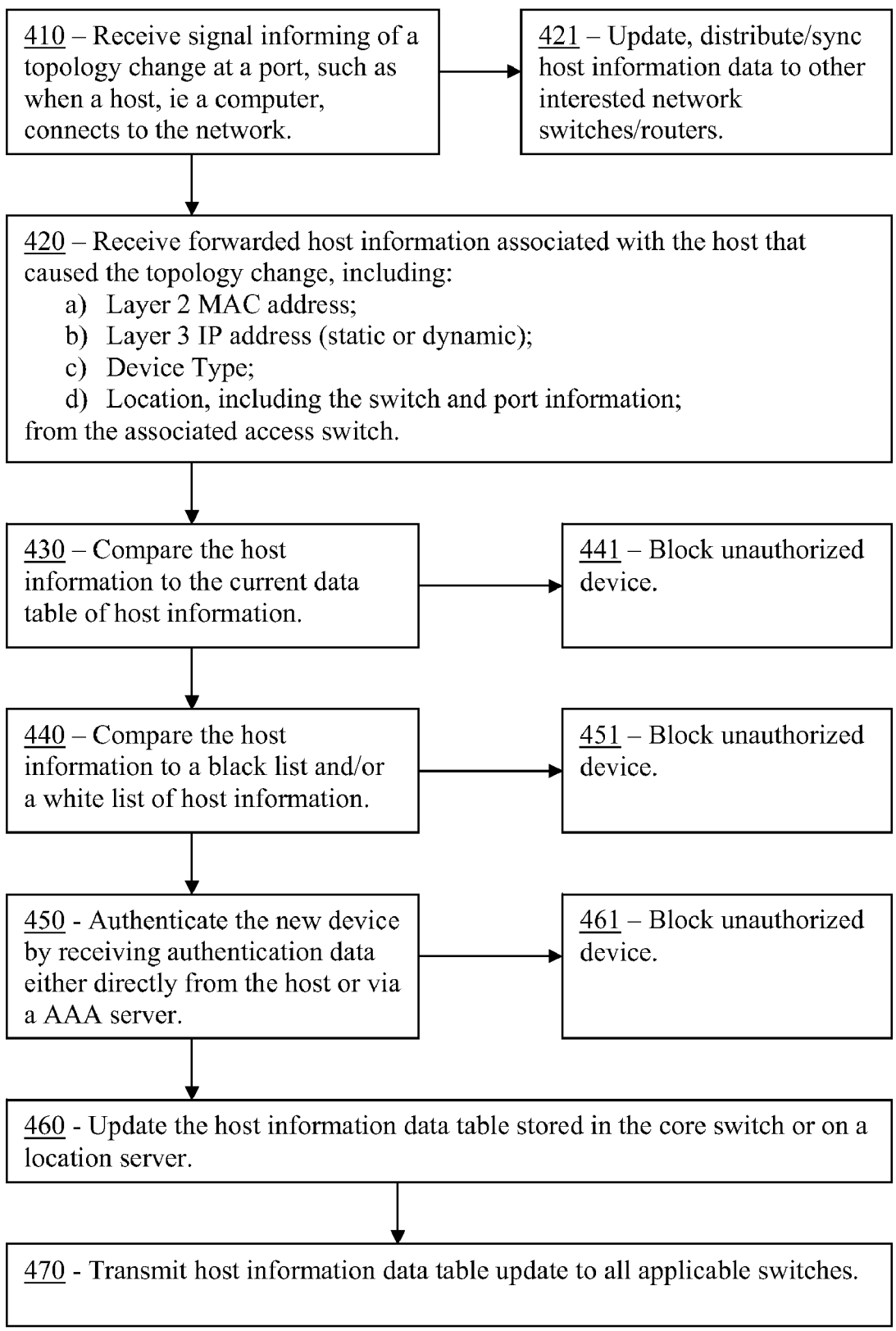
FIG. 4 is a flow chart illustrating the commands executed by the core switches in the routed access network, for practicing one or more embodiments of the present disclosure.

FIG. 4 is a flow chart illustrating the commands executed by the core switches in the routed access network, for practicing one or more embodiments of the present disclosure. Referring to FIGS. 2, 3, and 4, in one embodiment of the present disclosure, the first step executed by the core switch 210 is to receive a signal informing of a topology change in the network 410. This topology change can be either a connection of a host device, a disconnection of a host device, or a change in user of a host device. In the case that the topology chance is the disconnection of a device or a user logging out of a connected host device, the core switch 210 simply updates 421 the data table of host information 300 located in either the core switch itself 210 and all the other switches in the network, or a location server 211, where only the core switch 210 and access switches 231-234 are informed of the update. In the case that the topology change is a connection of a host device 241-245 or the logging in of a user, the core switch 210 then executes a procedure of security authentication and verification. The first step in the security authentication and verification procedure is to receive the host information 420 associated with the connected host device 241-245. This information can include the MAC address 301, IP address 302, IP address type 303, VLAN ID 304, forwarder address 305, port location 306, logged in user role 307, group 308, or device type 309.

Still referring to FIGS. 2, 3, and 4, once the core switch 210 has received the host information data from the host device 241-245 and access switches 231-234, the data is then compared with the current host information data table 300 to check if the specific user or device is already currently connected 430. These check are to protect against spoofing, or stealing an IP address to pretend to be an authorized device in order to connect to a network without authorization. Should the host information data received have an IP address or MAC address that shows to be the same as another device already authorized and connected to the network, the core switch will determine that spoofing has occurred and the intruding machine will be blocked, regardless of which port it is connected to, and network security notified in order to protect the security of the network 441. Should it be determined that the IP address 302 and MAC address 301 are unique, the core switch 210 may then optionally compare the host information with a black list and/or a white list of host information, including IP address 302 and MAC address 301, to check if the particular host is either authorized or banned from accessing the network 440. Should the host information be on the black list or not on the white list, the host device would then be blocked from accessing the network 451. Should the host information pass the white list or black list, the core switch would move on to the authentication process.

The device authentication may be done by either receiving the device authentication information forwarded directly from the host device 241-245, or via an AAA server 212 450. In the case that the host device is not authenticated, the device would be blocked from accessing the network 461. Should the host device pass the authentication process, the core switch 210 would then update the host information data table 300, located on the core switch 210 or a location server 211, to indicate the connection of the new authorized host 460.

In the case that the host information data table 300 is stored on the core switch 210 and all the other switches in the network, the core switch 210 would then forward the updated host information data table to all the other switches in the network, distributing the update synchronously to all the other switches using either Service Advertisement Framework protocols or Open Shortest Path First protocols. Alternatively, the data table of host information 300 could be stored on a location server 211, where only the core switches 210 and access switches 231-234 have access to the updated data table of host information 300 470.

Figure 5:
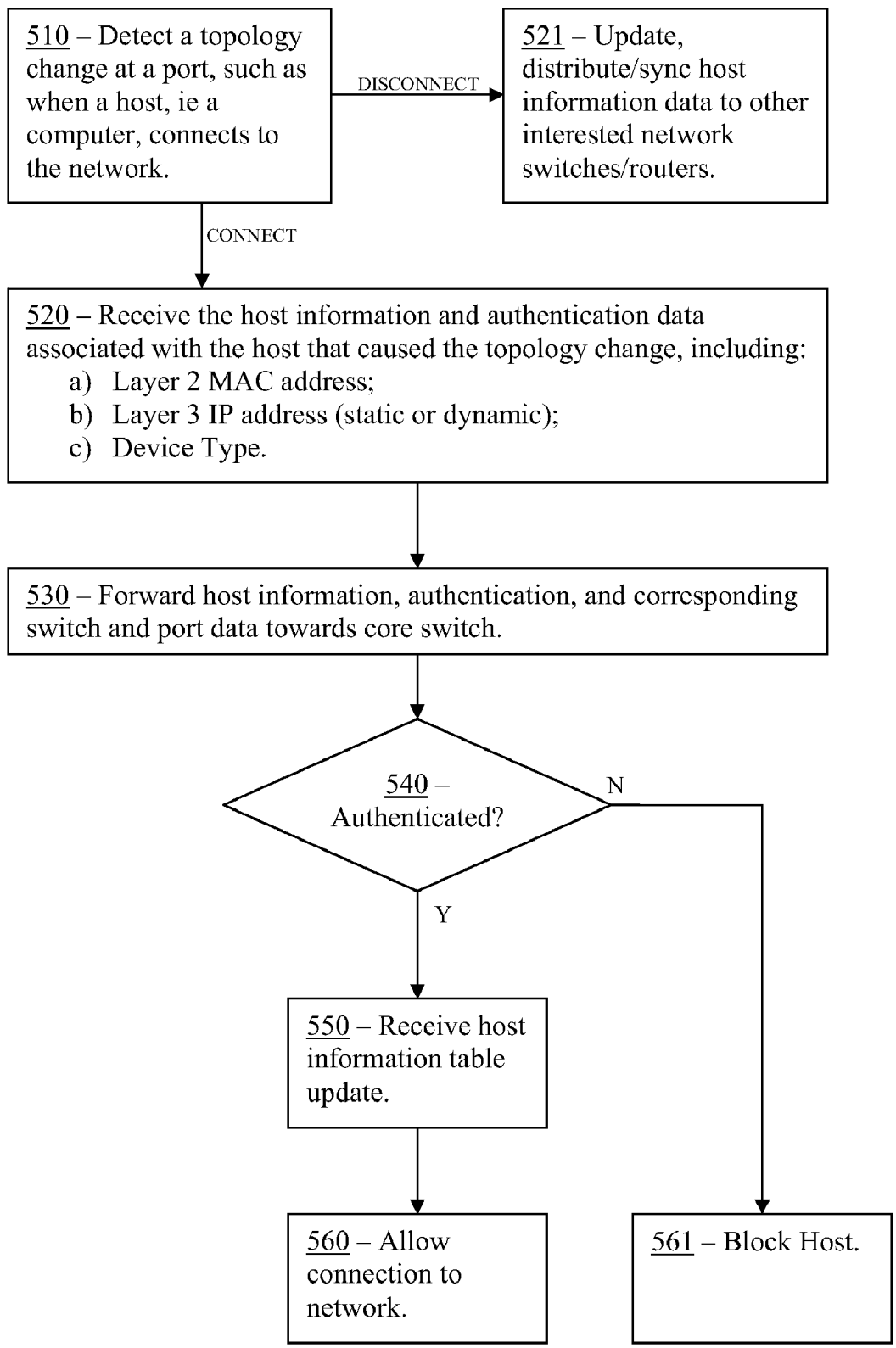
FIG. 5 is a flow chart illustrating the commands executed by the access switches in the routed access network, for practicing one or more embodiments of the present disclosure.

FIG. 5 is a flow chart illustrating the commands executed by the access switches in the routed access network, for practicing one or more embodiments of the present disclosure. Referring to FIGS. 2 and 5, in one embodiment of the present disclosure, the first step executed by the access switch is to detect a topology change, such as a connection or disconnection of a host device 241-245 from the network. In the case of a disconnection from the network, the access switch 231-234 would forward a signal to accordingly update the data table of binding information 300 to the core switch. In the case of a connection of a host device 241-245 to the network, the access switch 231-234 would then receive the host information and authentication data from the host device 241-245, including the MAC address, IP address, and device tag 520. The access switch 231-234 would then forward the host information and authentication data received from the host device 241-245, along with its own access switch location data and the corresponding port information data towards the core switch 210 for authentication 530.

In the case where the response from the core switch 210 is that the host device 241-245 is not authenticated, the switch will close the port to which the device is connected. However, should the device be authenticated, the access switch 231-234 will receive the updated host information data table 300 either directly from the core switch 210 via the synchronous update, or via access to the location server 211 550. Once authentication has been confirmed and the updated host information data table 300 is received, the access switch 231-234 will allow the host device 241-245 to connect to the network.

Figure 6:
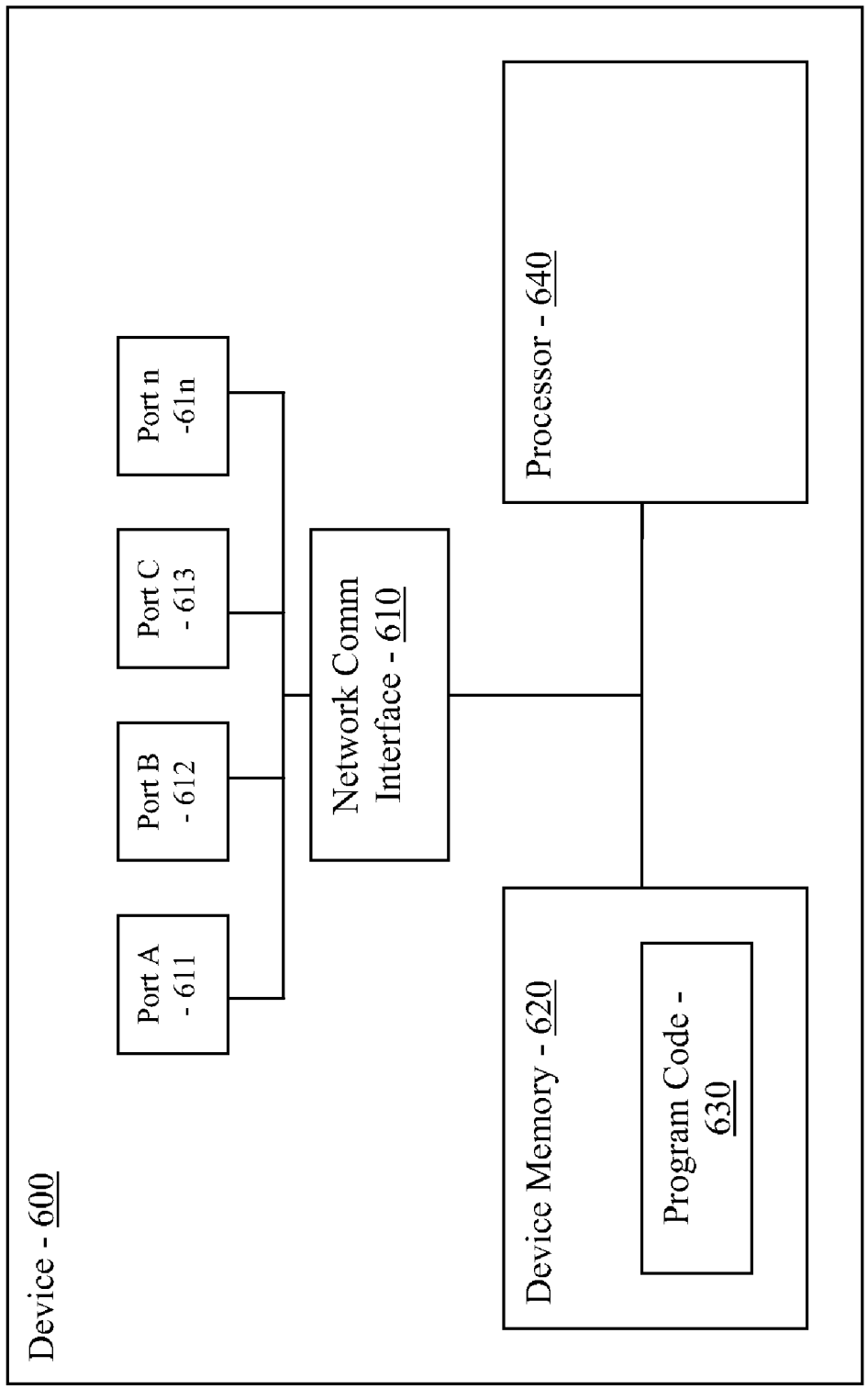
FIG. 6 is a representation of a routing apparatus device for practicing one or more embodiments of the present disclosure.

FIG. 6 is a representation of a routing apparatus device for practicing one or more embodiments of the present disclosure. The device 600 includes a network communication interface 610 with one or more communication terminals 611-61$n$, coupled to one or more processors 640, which will execute a set of instructions 630 encoded onto a memory 620. The program code 630 encoded onto the memory 620 is a set of instructions that when executed by the one or more processors defines the above method of providing address security incorporating layer 2 Media Access Control (MAC) addresses and corresponding layer 3 Internet Protocol (IP) addresses for host machines on a routed access network.

In one aspect of the present disclosure, there are provided method, system and computer program product to implement address security in a routed access network that has a multi-layer security measure. The security measure may include in one aspect, the layer 3 IP address security layer and the layer 2 MAC address security layer.

In one embodiment of the present disclosure, a data table of host information data is kept on the network. This data table of host information includes both the MAC address and the IP address of each host connected to the network. With both MAC and IP addresses tracked by the network security protocols, it becomes substantially more difficult to gain unauthorized access to the network. This is done by creating security violations based upon detecting either MAC addresses, IP addresses, or both, at unauthorized ports. The host information data table is synchronously updated on all applicable switches upon any end host or end device connectivity change in the access layer of the network.

In another embodiment of the present disclosure, additional device information can be included in the host information data table. Such information can include, but is not limited to, the specific switch and port location of the host device, device tag information to disclosure the type of device connected, different device groups, and physical locations of devices corresponding to specific switch and port locations. All these categories assist in determining if an unauthorized device is attempting to penetrate the network, as any of the categories can be compared with the host information data table information to check if the received information is consistent with what is expected.

In yet another embodiment of the present disclosure, the use of the host information data table can also be implemented for the use of optimizing troubleshooting. While today, for troubleshooting, network administrators must go from switch to switch through the tree to discover the problems, with the use of the host information data table, a network administrator can directly determine a device type and location without needing to travel through the entire branch of switches.

Accordingly, a method in one aspect of the present disclosure includes providing one or more switches in the network, providing one or more hosts for accessing the network, and providing a database of host information, accessible by at least one of the one or more switches in the network, where when one or more of the switches detects an end host or end device connectivity change, such as the connection, disconnection, or relocation of a host, in the network, the database of host information is updated.

The database may include one or more of the host's MAC address, IP address, switch location, port location, and device tag, and further, where the IP address may be dynamic, and where the database of host information may include a device type tag corresponding to the host information.

In another aspect, a copy of the database of host information may be stored in every switch in the network and all copies of the database are synchronously updated upon a change in the topology of the network, where the update to the database of host information may be distributed using Service Advertisement Framework protocols.

Also, the update to the database of host information may be distributed using Open Shortest Path First protocols.

In a further aspect, the database of host information may be stored on a server coupled to a switch in the network, where only the core switch and the access switches may be linked to the database of host information.

In another aspect, the method may include device authentication, which may be performed by a server coupled to a switch in the network.

The method may also include a white list linked to the database of host information, where the white list may be based on one or more of a host's MAC address and IP address.

The method may also include a black list linked to the database of host information, where the black list may be based on one or more of a host's MAC address and IP address.

An apparatus in accordance with another aspect may include means for providing one or more switches in the network, means for providing one or more hosts for accessing the network, means for providing a database of host information, accessible by at least one of the one or more switches in the network, where when one or more of the switches detects an end host or end device connectivity change, such as the connection, disconnection, or relocation of a host, in the network, the database of host information is updated.

An apparatus in another aspect of the present disclosure may include a network communications interface, one or more processors coupled to the network communications interface, and a memory storing instructions which, when executed by the one or more processors, provides a method for address security in a network based on a database of host information, where when one or more of the switches detects a topology change, such as a connection, disconnection, or relocation of a host, in the network, the database of host information is updated.

In this manner, in accordance with the embodiments of the present disclosure, methods, apparatus, system and computer program product for providing multi-layer address security incorporating Layer 2 Media Access Control (MAC) addresses and corresponding Layer 3 Internet Protocol (IP) addresses for host machines on a routed access network. A data table of host information of all the host devices connected to the network is created and updated with each host device connectivity change of the network. The data table includes, among others, the IP address, MAC address, and optionally other pieces of information about the end point devices. The data table of host devices is synchronously forwarded to all the participating switches in the network. The data table storing information about the host devices is used to create a distributed security blanket covering both Layer 2 and Layer 3.

Various other modifications and alterations in the structure and method of operation of the particular embodiments will be apparent to those skilled in the art without departing from the scope and spirit of the disclosure. Although the disclosure has been described in connection with specific particular embodiments, it should be understood that the disclosure as claimed should not be unduly limited to such particular embodiments. It is intended that the following claims define the scope of the present disclosure and that structures and methods within the scope of these claims and their equivalents be covered thereby.

What is claimed is:

1. A method, comprising:
providing a plurality of switches in a network;
providing a plurality of host devices for accessing the network;
providing a database of host information, the database of host information accessible by at least one of the plurality of switches, the database of host information including a plurality of entries, each entry of the database of host information associated with a host device connected to the network through at least one of the plurality of switches, each entry further including a layer 2 address and a layer 3 address assigned to the respective host device;
storing the database of host information in multiple switches in the network;
synchronously updating the database of host information stored at the multiple switches when a change in topology of the network is detected based at least in part on a host device connectivity change in the network, the update to the database of host information distributed based on Service Advertisement Framework protocol;
receiving a signal indicating that a new host device is connecting to the network through a given switch, the signal including a layer 2 address and a layer 3 address of the new host device;
comparing, by a processor of at least one switch, the layer 2 address and the layer 3 address of the new host device to layer 2 addresses and layer 3 addresses stored in the database of host information; and
if at least one of the layer 2 address and the layer 3 address of the new host device matches a layer 2 address or a layer 3 address of one or more entries of the database of host information, blocking the new host device from accessing the network.

2. The method of claim 1 wherein the connectivity change in the network includes detection of one of a connection, a disconnection, or a relocation of one of the plurality of host devices.

3. The method of claim 1, wherein
the database of host information includes a switch location, and a port location,
the layer 2 address assigned to the respective host device is a Media Access Control (MAC) address, and
the layer 3 address assigned to the respective host device is an Internet Protocol (IP) address.

4. The method of claim 3, wherein the IP address is one of dynamic IP address or static IP address.

5. The method of claim 1, including a white list associated with the database of host information.

6. The method of claim 1, including a black list associated with the database of host information.

7. The method of claim 6, wherein the black list is based at least in part on one or more of a host device Media Access Control (MAC) address or a host device Internet Protocol (IP) address.

8. An apparatus, comprising:
a network interface;
one or more processors coupled to the network interface; and
a memory for storing instructions which, when executed by the one or more processors, causes the one or more processors to store a database of host information, the database of host information including a plurality of entries, each entry of the database of host information associated with a host device connected to a network through at least one of a plurality of switches, each entry further including a layer 2 address and a layer 3 address assigned to the respective host device;

synchronously update the database of host information with a copy of the database of host information stored at another apparatus when a change in topology of the network is detected based at least in part on a host device connectivity change in the network, the update to the database of host information distributed based on Service Advertisement Framework protocol;

receive a signal indicating that a new host device is connecting to the network through a given switch, the signal including a layer 2 address and a layer 3 address of the new host device;

compare the layer 2 address and the layer 3 address of the new host device to layer 2 addresses and layer 3 addresses stored in the database of host information; and if at least one of the layer 2 address and the layer 3 address of the new host device matches a layer 2 address or a layer 3 address of one or more entries of the database of host information, block the new host device from accessing the network.

9. The apparatus of claim 8 wherein the connectivity change in the network includes detection of one of a connection, a disconnection, or a relocation of one of the host devices.

10. The apparatus of claim 8, wherein
the database of host information includes a switch location, and a port location,
the layer 2 address assigned to the respective host device is a Media Access Control (MAC) address, and
the layer 3 address assigned to the respective host device is an Internet Protocol (IP) address.

11. The apparatus of claim 10, wherein the IP address is one of dynamic IP address or static IP address.

12. The apparatus of claim 8, including a white list associated with the database of host information.

13. The apparatus of claim 8, including a black list associated with the database of host information.

14. The apparatus of claim 13, wherein the black list is based at least in part on one or more of a host device Media Access Control (MAC) address or a host device Internet Protocol (IP) address.

15. An apparatus, comprising:
a plurality of switches in a network;
a plurality of host devices for accessing the network;
a database of host information, the database of host information accessible by at least one of the plurality of switches, the database of host information including a plurality of entries, each entry of the database of host information associated with a host device connected to the network through at least one of the plurality of switches, each entry further including a layer 2 address and a layer 3 address assigned to the respective host device, the database of host information stored in multiple switches in the network, one or more of the multiple switches in the network performing:

synchronously updating the database of host information stored at the multiple switches when a change in topology of the network is detected based at least in part on a host device connectivity change in the network, the update to the database of host information distributed based on Service Advertisement Framework protocol;

receiving a signal indicating that a new host device is connecting to the network through a given switch, the signal including a layer 2 address and a layer 3 address of the new host device;

comparing, by a processor of at least one switch, the layer 2 address and the layer 3 address of the new host device to layer 2 addresses and layer 3 addresses stored in the database of host information; and blocking the new host device from accessing the network, if at least one of the layer 2 address and the layer 3 address of the new host device matches a layer 2 address or a layer 3 address of one or more entries of the database of host information.

\* \* \* \* \*